UNITED STATES PATENT OFFICE 2,620,331

COPPER-CONTAINING AZO DYESTUFFS

Walter Wehrli, Basel, Switzerland, assignor to Sandoz Limited, Basel, Switzerland, a Swiss firm No Drawing. Application January 16, 1951, Serial No. 206,312. In Switzerland August 24, 1944

6 Claims. (Cl. 260—148)

The present application is a continuation-in-part of my copending application Ser. No. 604,727 filed on July 12, 1945 (now abandoned).

The present invention relates to the manufacture of new copper compounds of polyazo dyestuffs and to the new compounds themselves.

It is well known that copper-containing disazo dyestuffs corresponding to the formula

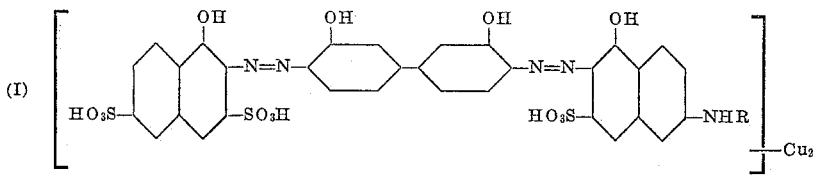

wherein R stands for a hydrogen atom or for a hydrocarbon or an acyl radical, may be prepared by the process described by Stüsser et al. in U. S. Patent No. 1,889,732. In order to produce the copper complexes it is necessary to heat the starting materials for a long time in an autoclave to temperatures of about 110–115° C., the usual coppering methods giving only partial coppering and therefore dyestuffs the fastness of which to light and to wet treatments do not respond to the requirements of the dyeing industry.

It is a primary object of the present invention to obviate the defects of this state of the art and to embody a process whereby the coppering may be carried out without the necessity of working in an autoclave and at temperatures higher than the boiling point of water. It is a further object of the invention to produce fully coppered dyestuffs of excellent fastness to light and to wet treatments.

These objects are realized according to the present invention with the aid of starting disazo dyestuffs of the type of dyestuff (I) supra, but which contain at least 3 sulfonic acid groups in the left-hand α-naphthol radical in the 3-, 6- and 8-positions. With these starting compounds, all the difficulties encountered with the compounds according to Stüsser et al. are eliminated, and the full coppering of the disazo dyestuffs may be realized without superatmospheric pressures or temperatures above 100° C. The coppering proceeds smoothly and yields fully coppered dyestuffs possessing excellent fastness to light and to wet treatments.

In preparing the new copper complexes according to the present invention, a starting compound corresponding to the formula

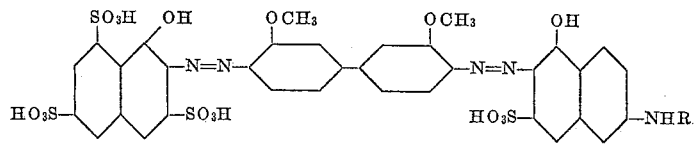

wherein R stands for a mononuclear aryl radical of the benzene series, an acetyl group or a benzoyl group, is subjected to a gentle boiling in an aqueous solution in presence of cuprammonium ions and an alkaline substance such as sodium carbonate or potassium carbonate. The mononuclear aryl radical may be a substituted or unsubstituted phenyl group, such as the phenyl group itself, or the alkylphenyl (e. g. methylphenyl) or alkoxyphenyl (e. g. methoxyphenyl) groups, etc. The coppering proceeds rapidly with splitting off of the methyl groups attached to the oxygen atoms of the diphenyl derivative, and uniform copper complexes, which then can be salted out from the solution, are obtained.

The new copper-containing disazo dyestuffs thus obtained correspond to the formula

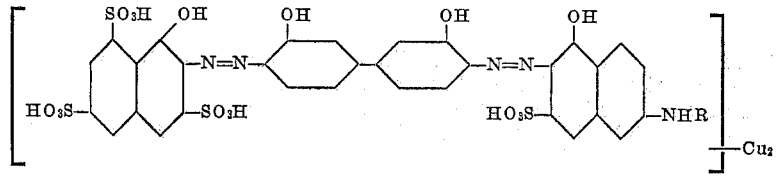

are easily soluble in water, possess excellent affinity for cellulose fibers and dye them in bright blue shades of excellent fastness to light and wet treatments.

The following examples illustrate the present invention, the parts being by weight.

Example 1

100 parts of the dyestuff of the formula

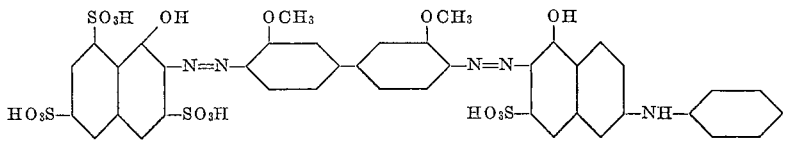

are dissolved in 2000 parts of water with addition of 20 parts of sodium carbonate. To this solution there are added, portionwise and while stirring at 80–90° C., 500 parts of an aqueous solution containing 50 parts of crystallized copper sulphate and 85 parts of a concentrated aqueous ammonia solution. The mixture is stirred for 5 hours at 80–90° C. and heated to boiling within 1 hour. The solution is then boiled for 15 hours under reflux. The complex copper compound

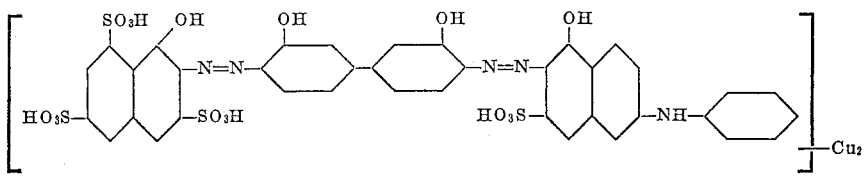

thus produced is salted out, filtered and dried. It is soluble in water with a blue coloration and in concentrated sulphuric acid with a greenish-blue coloration. It dyes cotton and regenerated cellulose in clear blue shades possessing very good fastness to light, to washing and to water.

Example 2

The process according to Example 1 is repeated except that the starting dyestuff is replaced by an equivalent quantity of the dyestuff of the formula

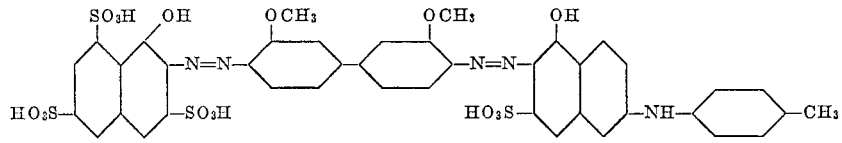

whereby the resultant copper complex corresponds to the formula

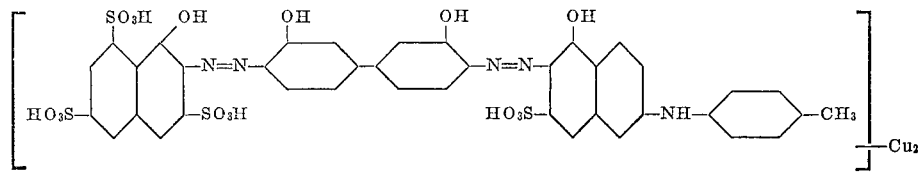

Example 3

By replacing the starting dyestuff of Example 1 by an equivalent quantity of the dyestuff of the formula

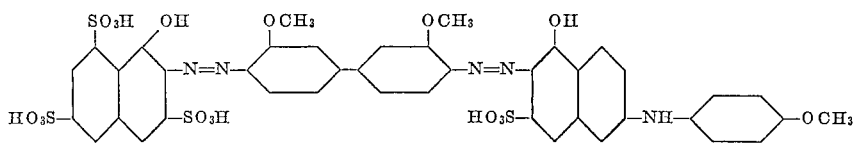

and otherwise proceeding in the manner described in such example, the dyestuff of the formula

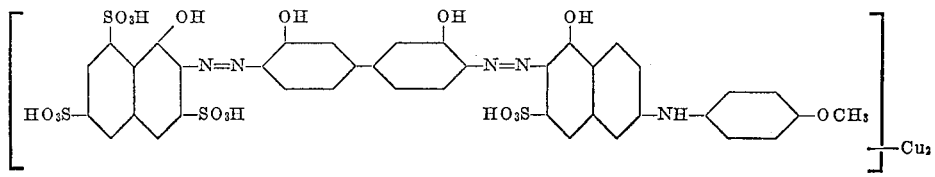

is obtained.

Example 4

100 parts of the dyestuff of the formula

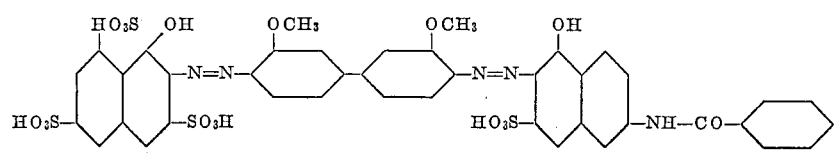

are dissolved in 2000 parts of water with addition of 20 parts of sodium carbonate. To this 4 by an equivalent quantity of the dyestuff of the formula

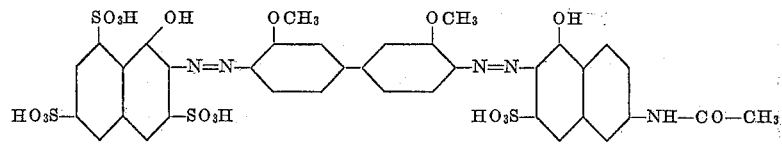

solution are added, portionwise and while stirring at 80–90° C., 500 parts of an aqueous solution containing 50 parts of crystallized copper sulphate and 85 parts of a concentrated aqueous ammonia solution. The mixture is stirred for 5 hours at 80–90° C. and heated to boiling within 1 hour. The solution is then boiled for 15 hours under reflux. The complex copper compound and otherwise proceeding in the manner described in such example, the dyestuff of the formula

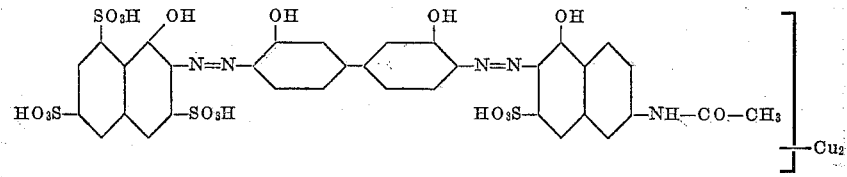

is obtained.

Having thus disclosed the invention what is claimed is:

1. A copper complex compound of the formula

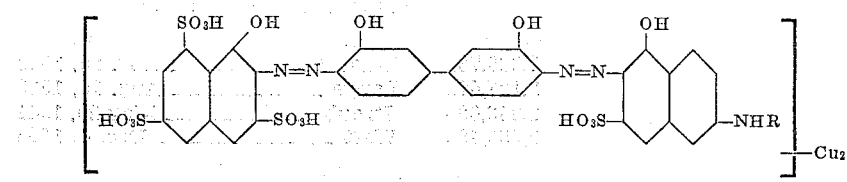

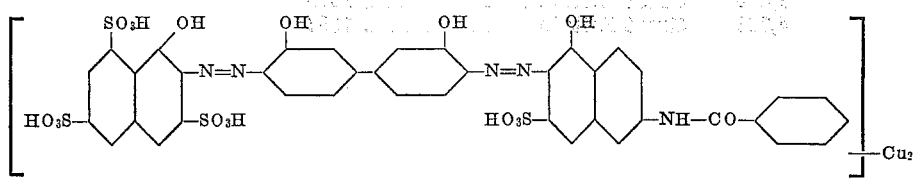

thus produced is salted out, filtered and dried. It is soluble in water with a blue coloration and in concentrated sulphuric acid with a greenish-blue coloration. It dyes cotton and regenerated cellulose in clear blue shades possessing very good fastness to light, to washing and to water.

wherein R stands for a member selected from the group consisting of phenyl, alkylphenyl, alkoxyphenyl, acetyl, and benzoyl radicals.

2. The copper complex compound of the formula

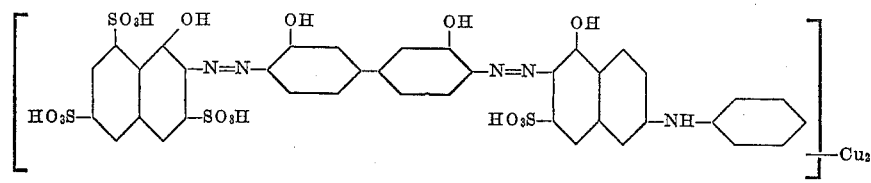

3. The copper complex compound of the formula

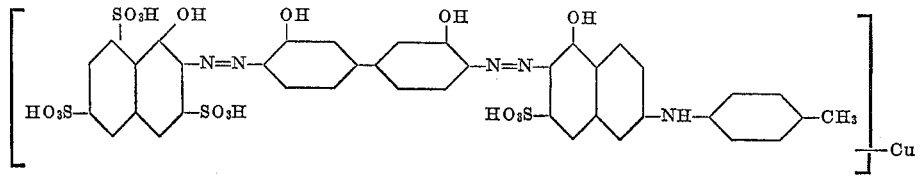

*Example 5*

By replacing the starting dyestuff of Example

4. The copper complex compound of the formula

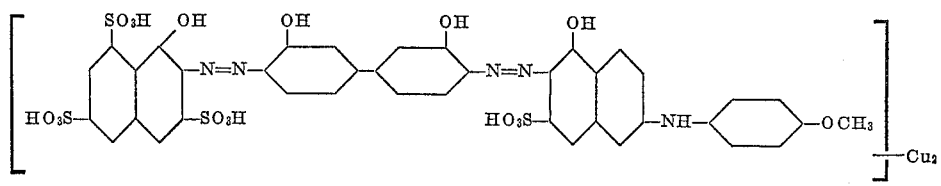

5. The copper complex compound of the formula
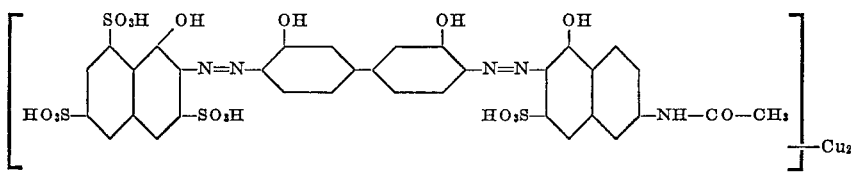
6. The copper complex compound of the formula
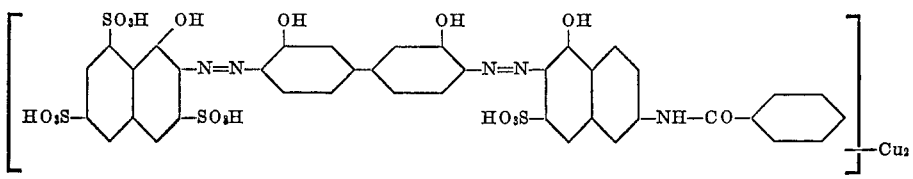
WALTER WEHRLI.
REFERENCES CITED
The following references are of record in the file of this patent:
UNITED STATES PATENTS
| Number | Name | Date |
|---|---|---|
| 1,889,732 | Stusser | Nov. 29, 1932 |
| 2,127,470 | Lange | Aug. 16, 1938 |
| 2,243,020 | Straub | May 20, 1941 |
| 2,390,480 | West | Dec. 4, 1945 |
FOREIGN PATENTS
| Number | Country | Date |
|---|---|---|
| 1,864 | Great Britain | 1879 |
| 4,703 | Great Britain | 1897 |